(12) United States Patent
Sakai et al.

(10) Patent No.: US 11,685,177 B2
(45) Date of Patent: Jun. 27, 2023

(54) RECORDING DEVICE

(71) Applicant: SEIKO EPSON CORPORATION, Tokyo (JP)

(72) Inventors: Nobuaki Sakai, Shiojiri (JP); Yukiya Beppu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/229,042

(22) Filed: Apr. 13, 2021

(65) Prior Publication Data

US 2021/0323327 A1    Oct. 21, 2021

(30) Foreign Application Priority Data

Apr. 16, 2020    (JP) .................................. 2020-073349

(51) Int. Cl.
| | |
|---|---|
| *B41J 29/13* | (2006.01) |
| *B41J 29/02* | (2006.01) |
| *B41J 29/54* | (2006.01) |
| *B41J 3/44* | (2006.01) |
| *B41J 2/01* | (2006.01) |

(52) U.S. Cl.
CPC ................. *B41J 29/13* (2013.01); *B41J 2/01* (2013.01); *B41J 3/445* (2013.01); *B41J 29/54* (2013.01)

(58) Field of Classification Search
CPC ... B41J 29/13; B41J 29/02; B41J 29/54; B41J 3/445; B41J 2/01
See application file for complete search history.

(56) References Cited

U.S. PATENT DOCUMENTS

| | | | |
|---|---|---|---|
| 5,267,009 A | 11/1993 | Takada et al. | |
| 2014/0292172 A1 | 10/2014 | Kawata et al. | |
| 2017/0126916 A1* | 5/2017 | Miura | ................ H04N 1/00535 |
| 2017/0361634 A1* | 12/2017 | Shirota | .................... B41J 29/13 |

FOREIGN PATENT DOCUMENTS

| | | |
|---|---|---|
| JP | H05-006042 A | 1/1993 |
| JP | 2014-192862 A | 10/2014 |

\* cited by examiner

*Primary Examiner* — Christopher E Mahoney
*Assistant Examiner* — Kendrick X Liu
(74) *Attorney, Agent, or Firm* — Workman Nydegger

(57) ABSTRACT

A recording device includes a first cover that is movable with respect to a recording unit that performs recording on a sheet, and that moves to a first open position for opening a space where the recording medium to be recorded by the recording unit is transported, and to a first closed position for closing the space, and a second cover movable with respect to the first cover. A movement direction of the first cover includes the same directional component as a movement direction of the second cover with respect to the recording unit, and a first coupling portion that couples the first cover and the second cover is provided in the recording device.

6 Claims, 7 Drawing Sheets

RECORDING DEVICE

The present application is based on, and claims priority from JP Application Serial Number 2020-073349, filed Apr. 16, 2020, the disclosure of which is hereby incorporated by reference herein in its entirety.

BACKGROUND

1. Technical Field

The present disclosure relates to a recording device.

2. Related Art

In related art, a recording device provided with a scanner that reads images and the like is known. In JP-A-2014-192862, a recording device is disclosed that includes a first cover provided so as to be able to pivot with respect to a structure including a recording unit, and a second cover provided so as to be able to pivot with respect to the first cover.

However, with the recording device disclosed in JP-A-2014-192862, since the second cover freely moves with respect to the first cover covering the recording unit, when a user attempts to open the recording unit by moving the first cover, there is a risk that an erroneous operation may be caused in which the user moves only the second cover.

SUMMARY

A recording device includes a first cover movable with respect to a recording unit configured to perform recording on a recording medium, and configured to move to a first open position for opening a space where the recording medium to be recorded by the recording unit is transported, and to a first closed position for closing the space, and a second cover movable with respect to the first cover. A movement direction of the first cover includes the same directional component as a movement direction of the second cover with respect to the recording unit, and a first coupling portion configured to couple the first cover and the second cover is provided in the recording device.

DESCRIPTION OF EXEMPLARY EMBODIMENTS

1. First Embodiment

Figure 1:
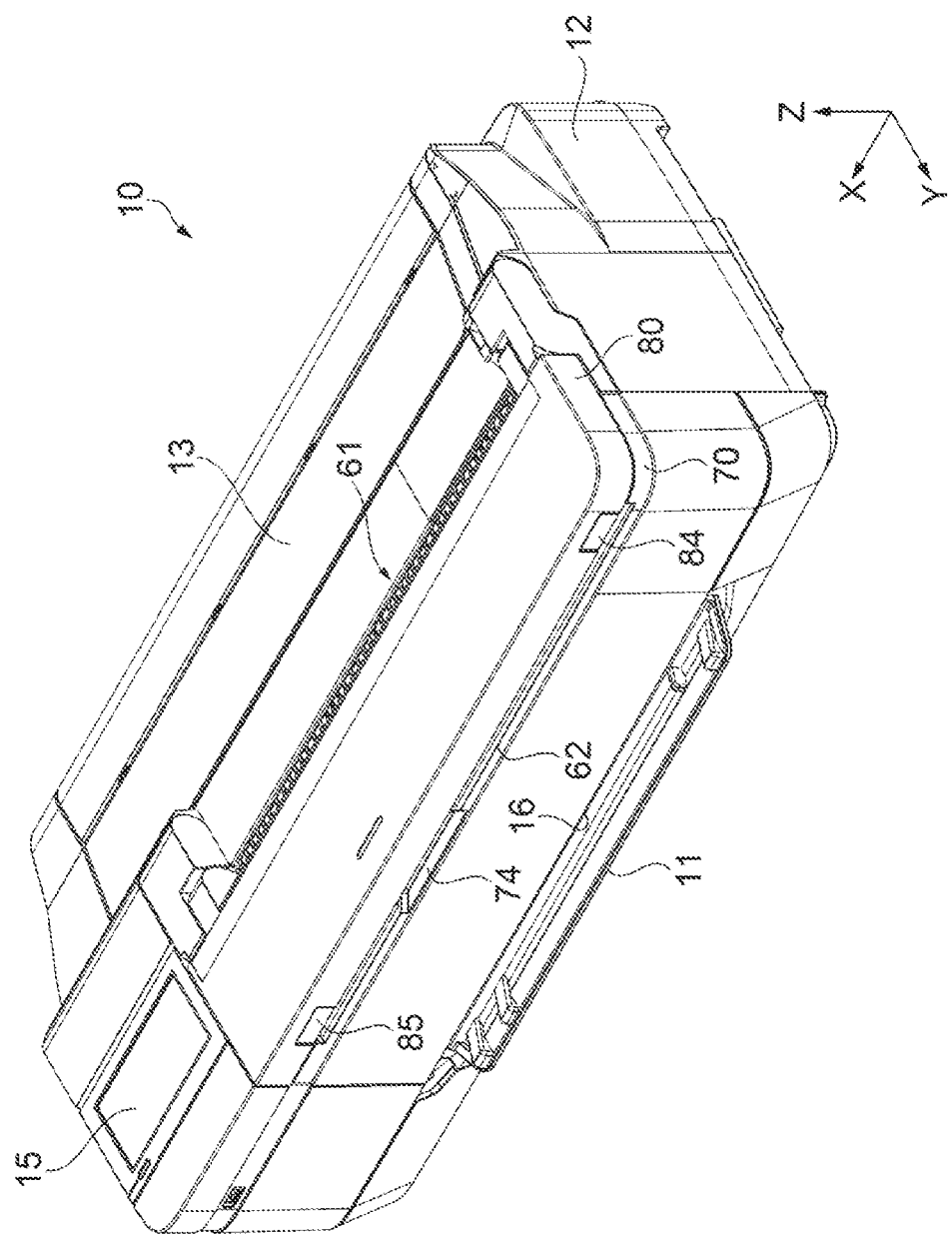
FIG. 1 is a perspective view of an external appearance of a recording device according to a first embodiment.

A schematic configuration of a recording device 10 according to a first embodiment will be described. The recording device 10 is, for example, an inkjet-type printer provided with a scanner that reads images and the like. In the coordinates illustrated in the drawings, three virtual axes orthogonal to each other are denoted as X, Y, and Z axes, based on the assumption that the recording device 10 is placed on a horizontal surface. The Y axis is an axis parallel to a front-rear direction of the recording device 10, and a tip side of an arrow indicating the Y axis is defined as "front". The X-axis is an axis parallel to a left-right direction of the recording device 10, and a tip side of an arrow indicating the X axis is defined as "left". The Z-axis is an axis parallel to the vertical direction, and a tip side of an arrow indicating the Z axis is defined as "up".

As illustrated in FIG. 1, the recording device 10 is a printer that can form an image on a sheet S as a recording medium. The recording device 10 can form an image on a relatively large roll paper as large as A1 size of the JIS standards, as the sheet S. Further, the recording device 10 can also form an image on a single sheet paper of A4 size or the like, as the sheet S.

Figure 2:
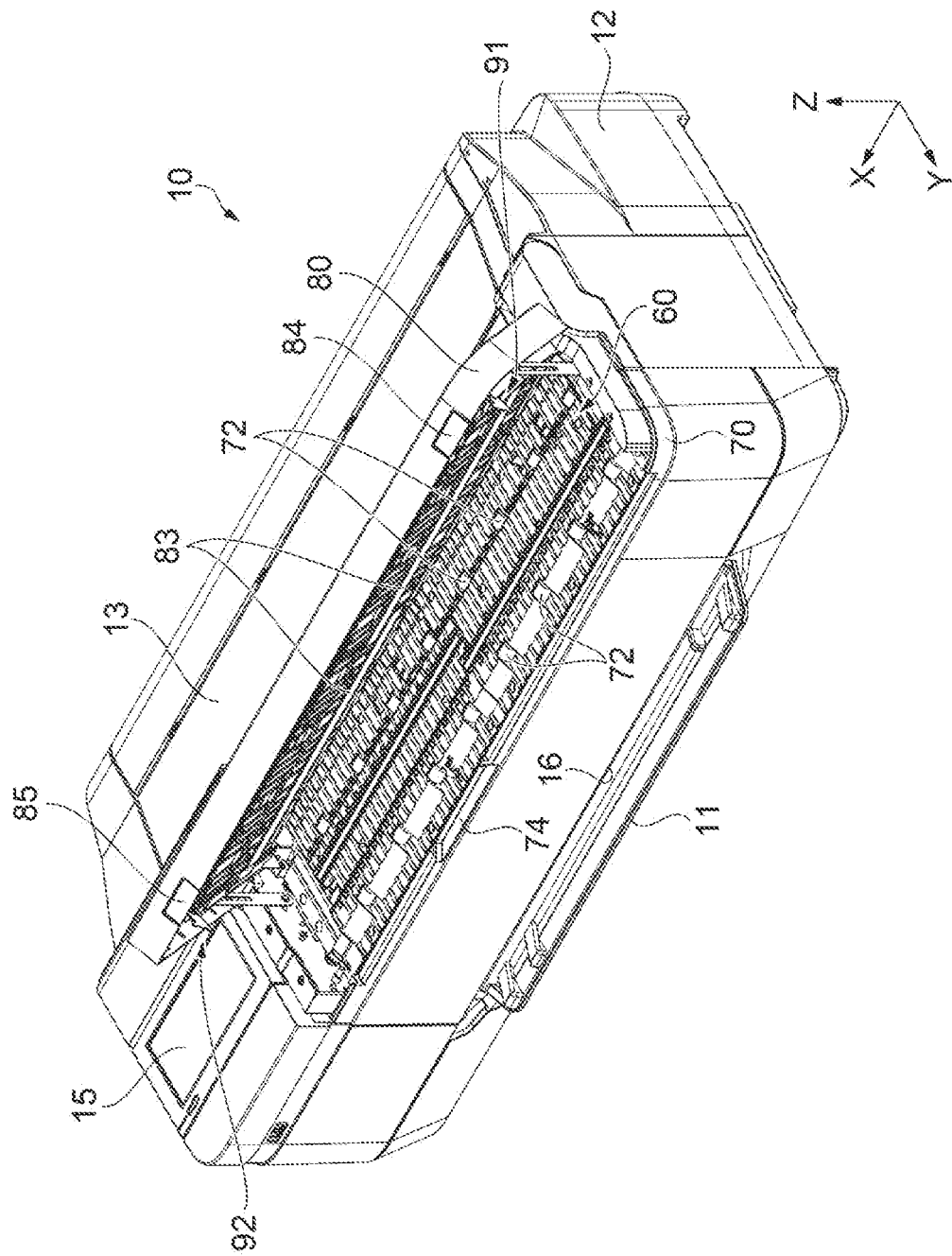
FIG. 2 is a perspective view illustrating the recording device in a state in which a second cover is positioned in a second open position.
Figure 3:
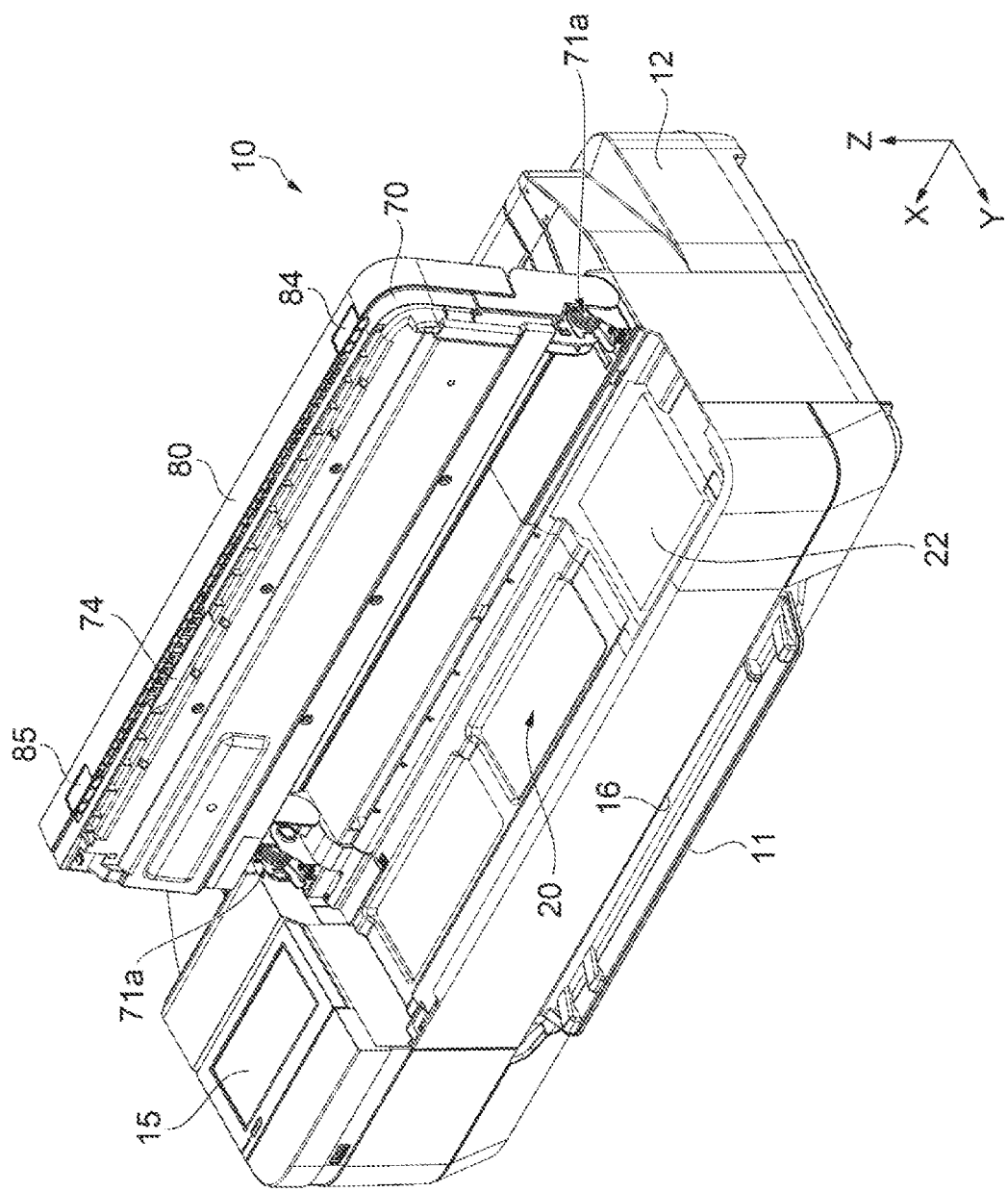
FIG. 3 is a perspective view illustrating the recording device in a state in which a first cover is positioned in a first open position.

As illustrated in FIG. 1 to FIG. 3, the recording device 10 includes a substantially cuboid-shaped housing 12 that is long in the left-right direction. On an upper surface of the housing 12, a paper feed cover 13 is located on the rear side, and a first cover 70 and a second cover 80 are located on the front side. The paper feed cover 13, the first cover 70, and the second cover 80 can be opened and closed. In a position adjacent to the second cover 80 in the X axis direction on the upper surface of the housing 12, an operating panel 15 is provided that is used for performing various operations of the recording device 10. A paper discharge port 16 is provided in a front surface of the housing 12. The sheet S, on which an image or the like has been recorded in the housing 12, is discharged from the paper discharge port 16 toward the front. Further, on the front surface of the housing 12, a paper discharge unit 11 is provided that supports the sheet S discharged from the paper discharge port 16.

Figure 4:
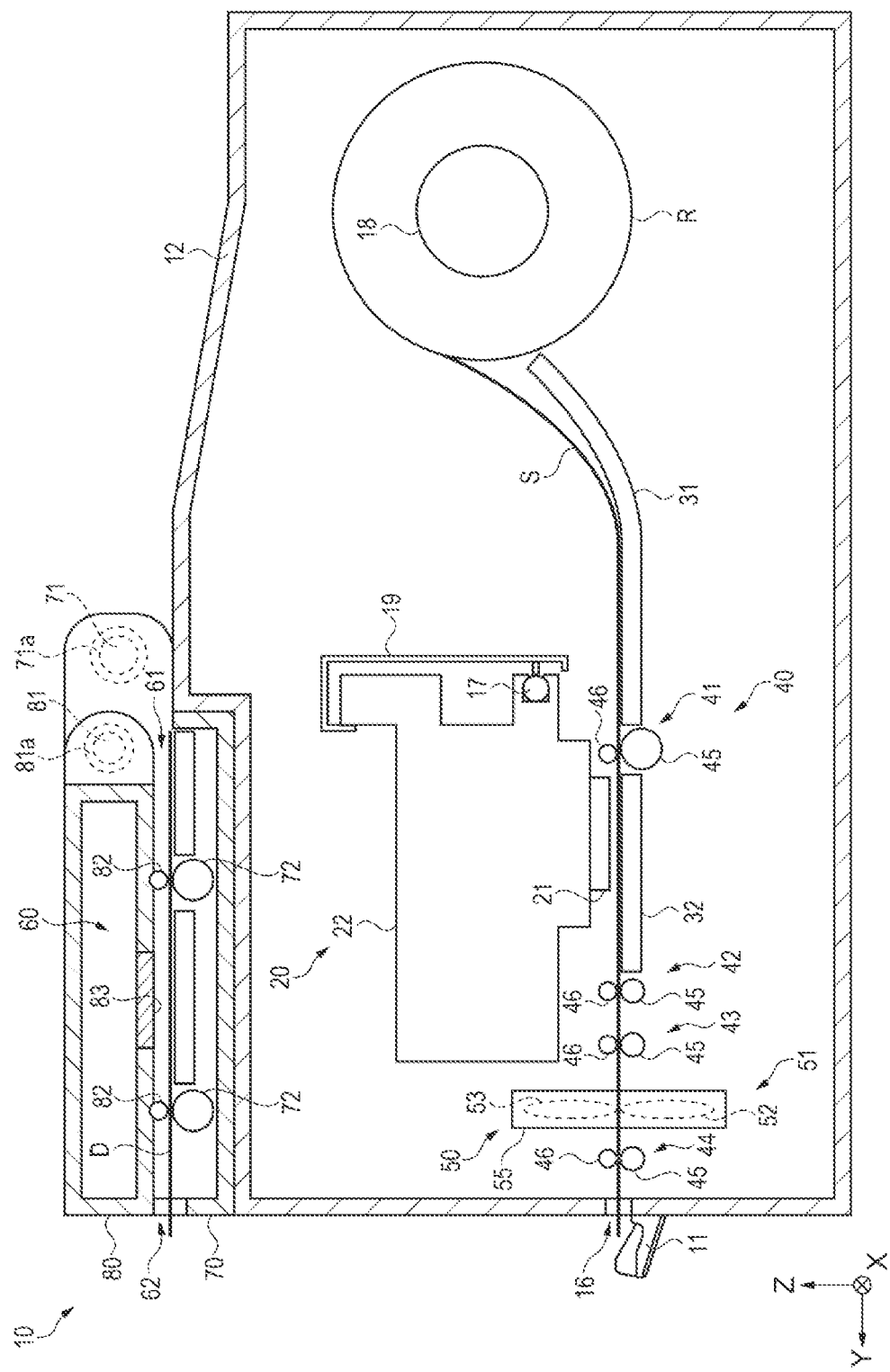
FIG. 4 is a schematic cross-sectional view illustrating an internal configuration of the recording device.

As illustrated in FIG. 4, a roll body R in which the sheet S is wound in a roll shape is disposed in the housing 12. The roll body R is disposed on the rear side in the housing 12. The roll body R is rotatably supported by a shaft 18 extending in the left-right direction parallel to the width direction of the sheet S. In this embodiment, the sheet S is unwound from the roll body R as a result of the shaft 18 being rotated in the counterclockwise direction in FIG. 4. The unwound sheet S is transported by a transport unit 40 and discharged from the interior of the housing 12 to the outside of the housing 12 through the paper discharge port 16 that opens to the front surface of the housing 12. In other words, in this embodiment, a path on which the unwound sheet S is transported to the paper discharge port 16 by the transport unit 40 is a transport path, and a direction from the rear to the front of the housing 12, that is, a direction from the right to the left in FIG. 4 is a transport direction of the sheet S transported by the transport unit 40.

The recording device 10 includes a recording unit 20 that performs recording on the sheet S, the transport unit 40 that transports the sheet S along the transport path, a cutting mechanism 50 that cuts the sheet S, and a reading unit 60 that reads a sheet D, which is a medium to be read.

The recording unit 20 includes a head 21 that ejects a liquid, such as ink, toward the sheet S, and a carriage 22 on which the head 21 is mounted. The carriage 22 is supported by a frame 19 provided in the housing 12 and a guide shaft 17 attached to the frame 19. The guide shaft 17 extends in the width direction of the sheet S. The carriage 22 is movable along the guide shaft 17 by a drive source such as a motor. In other words, the carriage 22 can reciprocate in the width direction. The head 21 can eject ink over an entire region in the width direction of the sheet S as a result of the carriage 22 moving along the guide shaft 17. Note that a configuration in which the liquid is supplied from a cartridge that can be mounted on the carriage 22, or a configuration in which the liquid is supplied from a bottle or a tank provided inside or outside the housing 12 may be adopted.

A first support member 31 and a second support member 32 are plate-like members and configure the transport path of the sheet S. The second support member 32 is disposed so as to face the head 21 of the recording unit 20. The first support member 31 is disposed upstream of the second support member 32 in the transport direction, and guides the sheet S unwound from the roll body R toward the recording unit 20.

The transport unit 40 transports the sheet S unwound from the roll body R from the interior of the housing 12 toward the paper discharge port 16, along the first and second support members 31 and 32. The transport unit 40 includes a first transport roller pair 41, a second transport roller pair 42, a third transport roller pair 43, and a fourth transport roller pair 44 in this order, from upstream to downstream in the transport direction. The first transport roller pair 41 is disposed upstream of the head 21 in the transport direction, and is disposed between the first support member 31 and the second support member 32. The second, third, and fourth transport roller pairs 42, 43, and 44 are disposed downstream of the head 21 in the transport direction.

The first transport roller pair 41 includes a driving roller 45 that can be driven to rotate by a motor (not illustrated), and a driven roller 46 that can be driven to rotate by the rotation of the driving roller 45. By the driving roller 45 rotating with the sheet S sandwiched between the driving roller 45 and the driven roller 46, the sheet S is transported by the first transport roller pair 41. The driven roller 45 is disposed so as to come into contact with the sheet S from below. The driven roller 46 is disposed so as to come into contact with the sheet S from above. Similarly to the first transport roller pair 41, the second, third, and fourth transport roller pairs 42, 43, and 44 each include the driving roller 45 and the driven roller 46. Therefore, when transporting the sheet S, the driven rollers 46 of the second, third, and fourth transport roller pairs 42, 43, and 44 come into contact with a surface of the sheet S onto which the liquid has been ejected. Thus, the driven rollers 46 of the second, third, and fourth transport roller pairs 42, 43, and 44 are each configured by a star wheel or the like having a small contact area with respect to the sheet S, in order to reduce deterioration of the quality of the image recorded on the sheet S. The first to fourth transport roller pairs 41, 42, 43, and 44 are respectively disposed in a plurality thereof at a predetermined interval in the width direction.

The cutting mechanism 50 is disposed between the third transport roller pairs 43 and the fourth transport roller pairs 44 in the transport direction. The sheet S cut by the cutting mechanism 50 is discharged from the paper discharge port 16 as a result of being transported by the fourth transport roller pairs 44. Note that the recording device 10 according to this embodiment is configured to have a relatively small gap in the vertical direction in an opening of the paper discharge port 16, so that a finger of a user cannot be inserted into the housing 12 from the paper discharge port 16. Thus, by disposing the fourth transport roller pairs 44 in the vicinity of the upstream side of the paper discharge port 16, the sheet S can be smoothly transported toward the paper discharge port 16, and occurrence of a paper jam can be suppressed.

The cutting mechanism 50 includes a cutting blade 51 for cutting the sheet S and a holding body 55 that holds the cutting blade 51. The cutting blade 51 is configured by a driving blade 52 and a driven blade 53 each having a disk-like shape. The driving blade 52 and the driven blade 53 are rotatably attached to the holding body 55. The driving blade 52 and the driven blade 53 are provided so as to be arranged side by side in the vertical direction. The holding body 55 can reciprocate along the X axis direction. The cutting mechanism 50 cuts the sheet S using the cutting blade 51 by moving the holding body 55 along the X axis direction. In other words, the cutting mechanism 50 including the cutting blade 51 cuts the sheet S by scanning in the width direction intersecting the transport direction of the sheet S.

Note that the cutting mechanism 50 may be caused to reciprocate along the X axis direction by a driving force transmitted from a drive source, such as a motor, provided in the cutting mechanism 50, or the cutting mechanism 50 may be caused to reciprocate along the X axis direction by a driving force of a motor for moving the carriage 20.

The reading unit 60 is configured by the first cover 70 and the second cover 80, and includes an imaging element 83 that reads the sheet D positioned between the first cover 70 and the second cover 80.

The first cover 70 has a rectangular shape that is long in the left-right direction, and is configured to be movable with respect to the recording unit 20. The first cover 70 moves to a first open position for opening a space into which the sheet S to be recorded by the recording part 20 is transported, and to a first closed position for closing the space into which the sheet S is transported. The first cover 70 according to this embodiment is positioned above the recording unit 20, and is engaged with the housing 12 so as to be able to pivot about first support shafts 71. The first support shafts 71 are pivoting shafts parallel to the X axis, and are provided at both left and right end portions in the rear end of the first cover 70. The first cover 70 in the first closed position moves to the first open position as a result of the front end of the first cover 70 pivoting upward and rearward about the first support shafts 71 in an arc shape. In other words, a movement direction of the first cover 70 includes an upper direction component and a rear direction component. Each of the first support shafts 71 is provided with a coil spring 71$a$, as a holding mechanism, that holds the first cover 70 in the first open position. The coil spring 71$a$ is wound around the outer circumference of each of the left and right first support shafts 71, and urges the first cover 70 to be in the first open position.

The second cover 80 has a rectangular shape that is long in the left-right direction, and is configured to be movable with respect to the first cover 70. The second cover 80 moves to a second open position for opening a space in which the imaging element 83 is provided, and to a second closed position for closing the space in which the imaging element 83 is provided. The second cover 80 according to this embodiment is positioned in a position overlapping with the first cover 70 in the second closed position. The second cover 80 is engaged with the first cover 70 so as to be able to pivot about second support shafts 81, each of which serves as a support shaft. The second support shafts 81 are pivoting shafts parallel to the X axis, and are provided at both left and right end portions in the rear end of the second cover 80. The second cover 80 in the second closed position moves to the second open position as a result of the front end of the second cover 80 pivoting upward and rearward about the second support shafts 81 in an arc shape. In other words, a movement direction of the second cover 80 with respect to the recording unit 20 includes the same directional components as those of the movement direction of the first cover 70. Each of the second support shafts 81 is provided with a coil spring 81*a*, as a holding mechanism, that holds the second cover 80 in the second open position. The coil spring 81*a* is wound around the outer circumference of each of the left and right second support shafts 81, and urges the second cover 80 to be in the second open position.

The reading unit 60 is provided with an insertion port 61 into which the sheet D is inserted and a discharge port 62 from which the sheet D is discharged, in a state in which the first cover 70 and the second cover 80 are both in their closed positions. The insertion port 61 is provided between the first cover 70 and the second cover 80 at the rear end of the second cover 80. The discharge port 62 is provided between the first cover 70 and the second cover 80 at the front end of the second cover 80. A direction from the insertion port 61 toward the discharge port 62 is a transport direction of the sheet D.

The reading unit 60 includes first rollers 72 and second rollers 82 that transport the sheet D, and the imaging element 83 that converts an image of the sheet D into electrical signals. The imaging element 83 is an image sensor that is long in the width direction of the sheet D, and is provided on a lower surface of the second cover 80. The first rollers 72 are provided on the upper surface of the first cover 70, and the second rollers 82 are provided on the lower surface of the second cover 80.

In the second closed position in which the second cover 80 is closed with respect to the first cover 70, the first rollers 72 are provided upstream and downstream of the imaging element 83 in the transport direction of the sheet D, and are provided at an appropriate interval in the width direction of the sheet D. In the second closed position in which the second cover 82 is closed, the second rollers 82 are provided in positions in which they come into contact with the first rollers 72. The first roller 72 is driven to rotate by a drive source such as a motor, and the second roller 82 is driven to rotate by the rotational drive of the first roller 72. The not yet read sheet D inserted from the insertion port 61 is sandwiched between the first roller 72 and the second roller 82 and is transported to a reading start position. Then, when a reading start operation is performed, the sheet D is sequentially transported toward the discharge port 62, and the sheet D that has been read by the imaging element 83 is discharged from the discharge port 62 toward the front. A range, including a region in the width direction of the sheet D, from the insertion port 61 to the discharge port 62 is a transport path on which the sheet D is transported.

Figure 5:
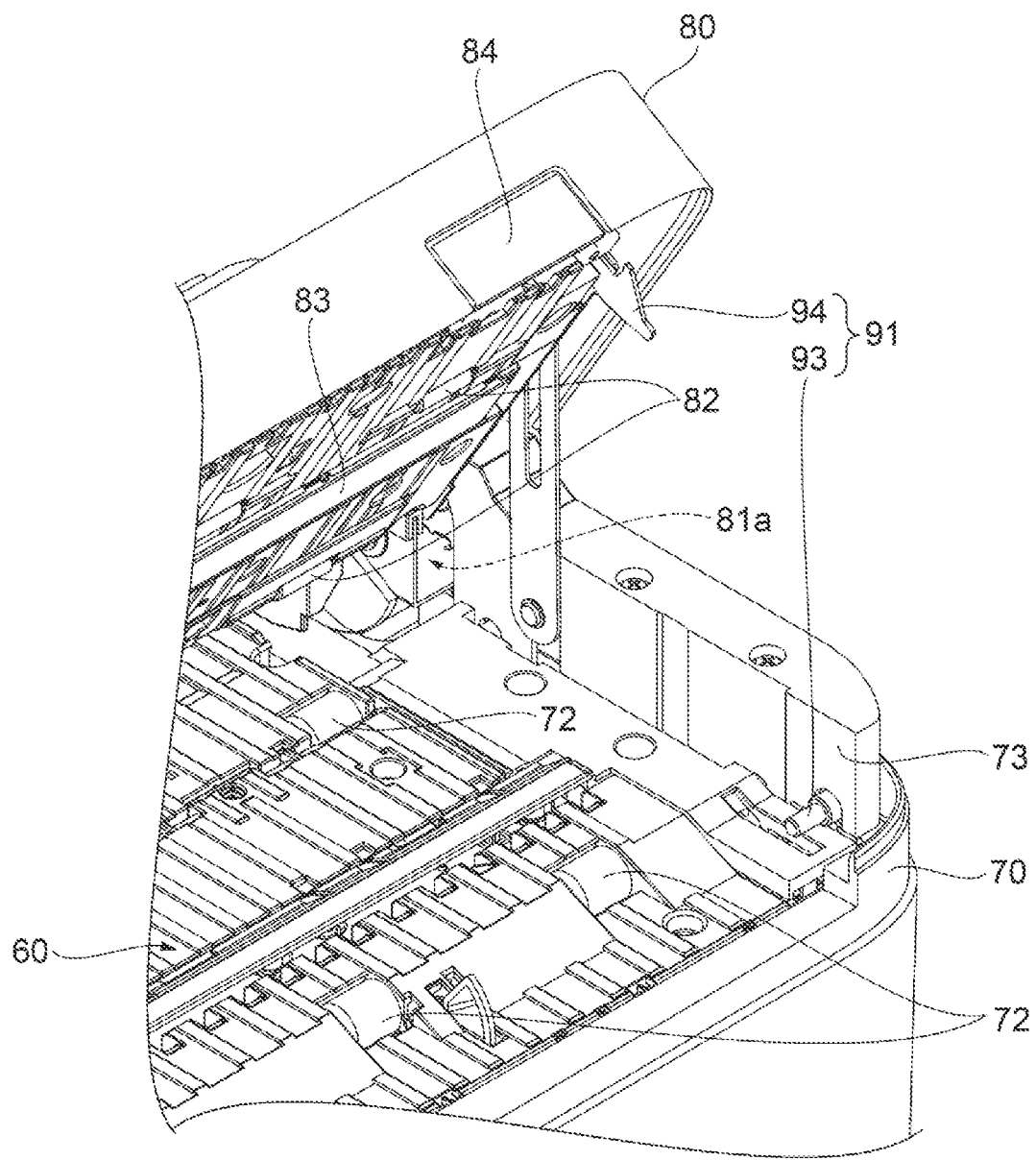
FIG. 5 is a perspective view illustrating a configuration of a first coupling portion.

As illustrated in FIG. 5, the recording device 10 includes a first coupling portion 91 and a second coupling portion 92 that couple the first cover 70 and the second cover 80. The first coupling portion 91 is provided on the outer side of one side of the transport path in the width direction of the sheet D. The second coupling portion 92 is provided on the outer side of the other side of the transport path in the width direction of the sheet D.

Further, on the right-hand side of a front surface of the second cover 80, a first operating portion 84 is provided that causes the first coupling portion 91 to be switched between a coupled state and an uncoupled state. On the left-hand side of the front surface of the second cover 80, a second operating portion 85 is provided that causes the second coupling portion 92 to be switched between the coupled state and the uncoupled state.

Figure 6A:
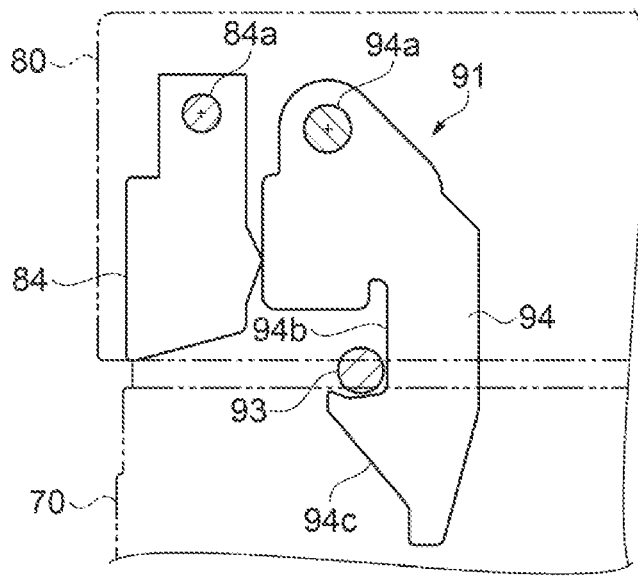
FIG. 6A is a schematic cross-sectional view illustrating the first coupling portion in a coupled state.
Figure 6B:
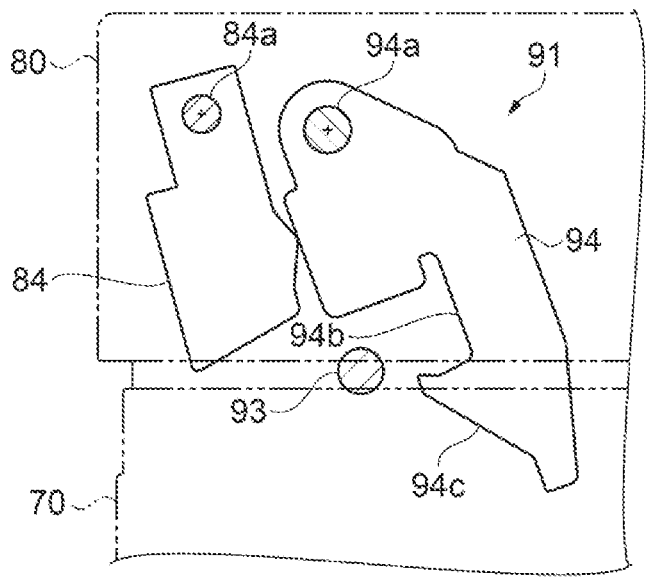
FIG. 6B is a schematic cross-sectional view illustrating the first coupling portion in an uncoupled state.

A configuration of the first coupling portion 91 will be described with reference to FIG. 6A and FIG. 6B. FIG. 6A illustrates the first coupling portion 91 in the coupled state, and FIG. 6B illustrates the first coupling portion 91 in the uncoupled state. Note that a configuration of the second coupling portion 92 is the same as the configuration of the first coupling portion 91, and a description thereof will thus be omitted.

The first coupling portion 91 includes a coupling shaft 93 that protrudes in the X axis direction from a right inner wall 73 of the first cover 70, and a coupling member 94 that is engageable with the coupling shaft 93. The coupling member 94 is a plate-like member that is flat in the Y axis direction, and includes a notch portion 94*b* that opens from the front toward the rear and comes into contact with the lower side and the rear side of the coupling shaft 93 in the coupled state, and an inclined surface 94*c* that extends downward and to the rear from a front portion, on the lower side, of the notch portion 94*b*. The coupling member 94 includes a pivoting shaft 94*a* that extends in the X axis direction, and an urging member that causes the coupling member 94 to be positioned in a position for the coupled state. The pivoting shaft 94*a* is provided above the notch portion 94*b*, and supports the coupling member 94 so that the coupling member 94 can pivot rearward about the pivoting shaft 94*a* as a center of rotation.

The first operating portion 84 is a cuboid-shaped member that is long in the X axis direction, and includes a pivoting shaft 84*a* that is parallel with the pivoting shaft 94*a* of the coupling member 94. The pivoting shaft 84*a* is provided in front of the pivoting shaft 94*a* and above the first operating portion 84, and supports the first operating portion 84 so that the first operating portion 84 can pivot rearward about the pivoting shaft 84*a* as a center of rotation. A rear surface of the first operating portion 84 and a front surface of the coupling member 94 are slidably in contact with each other.

When the user performs an operation of pressing the first operating portion 84, the first operating portion 84 pivots rearward, and as a result of the coupling member 94 being pressed by the first operating portion 84, the coupling member 94 pivots rearward in resistance to an urging force of the urging member. As a result, the first coupling portion 91 moves from a coupled position illustrated in FIG. 6A to an uncoupled position illustrated in FIG. 6B. When the tip of the second cover 80 is pivoted upward and rearward in a state in which the first operating portion 84 is pressed by the user, the second cover 80 is caused to be in the second open position with respect to the first cover 70, and maintenance can be performed on the reading unit 60 that is open. When the first operating unit 84 is not operated in a state in which the second cover 80 is in the second closed position, the first coupling portion 91 is maintained in the coupled position.

When the front end of the second cover 80 in the second open position is pivoted forward and downward, the second cover 80 is coupled to the first cover 70. Specifically, as the second cover 80 moves downward, the coupling shaft 93 slides against the inclined surface 94c of the coupling member 94 while being in contact with the inclined surface 94c. As a result, the coupling member 94, which is positioned in the coupled position in the uncoupled state, moves to the uncoupled position while pivoting rearward. When the coupling shaft 93 reaches the notch portion 94b, the coupling member 94 is urged to be in the coupled position by the urging force of the urging member, and the coupled state is obtained in which the coupling shaft 93 and the coupling member 94 are engaged with each other. In other words, the second cover 80 can be coupled to the first cover 70 without operating the first operating portion 84.

The recording device 10 includes a gripping portion 74 that is gripped when opening the first cover 70. As illustrated in FIG. 1 and FIG. 2, the gripping portion 74 is configured by causing a central portion on the front surface of the first cover 70 to be recessed to the rear. When opening the first cover 70, the lower edge of the front surface of the second cover 80 is gripped by a finger of the user inserted into the gripping portion 74, and the first cover 70 coupled with the second cover 80 pivots upward and rearward. Note that the color of the gripping portion 74 is preferably a color different from that of the first and second operating portions 84 and 85, which are respectively provided on the right and left sides of the front surface of the second cover 80.

As described above, according to the recording device 10 of this embodiment, the following effects can be obtained.

The recording device 10 includes the first cover 70 that is movable with respect to the recording unit 20, and the second cover 80 that is movable with respect to the first cover 70. Since the second cover 80 is coupled to the first cover 70 by the coupling portion, when the user attempts to move the first cover 70 to the first open position for opening the space in which the sheet D is transported to the recording unit 20, an erroneous operation can be suppressed in which the second cover 80 is moved to the second open position.

When the second cover 80 is in the second closed position, during a reading operation of the sheet D, it is difficult to access the space in which the imaging element 83 is provided. However, by causing the second cover 80 to be in the second open position, since the space in which the imaging element 83 is provided is exposed, the maintenance of the reading unit 60 becomes easy.

Even when the first cover 70 is positioned in the first open position, since the sheet D is sandwiched between the first rollers 72 and the second rollers 82, a positional shift of the sheet D in the reading portion 60 is suppressed.

The recording device 10 includes the independently-operated first operating portion 84 and second operating portion 85 that respectively cause the first coupling portion 91 and the second coupling portion 92 to be switched between the coupled state and the uncoupled state. By configuring the first coupling portion 91 and the second coupling portion 92 so as to respectively correspond to the first operating portion 84 and the second operating portion 85 in a one-to-one manner, it is possible to simplify a mechanism for releasing the engagement of each of the first and second coupling portions 91 and 92.

Since the color of the first and second operating portions 84 and 85 is different from the color of the gripping portion 74, an erroneous operation, namely, a mistake between selecting an operation for positioning the first cover 70 in the first open position and an operation for positioning the second cover 80 in the second open position, can be suppressed.

2. Second Embodiment

A schematic configuration of a recording device 100 according to a second embodiment will be described. Note that the same components as those of the first embodiment will be assigned the same reference signs, and redundant descriptions thereof will be omitted. The recording device 100 described in this embodiment differs from the first embodiment with respect to a movement mode of the second cover 80 described in the first embodiment.

Figure 7:
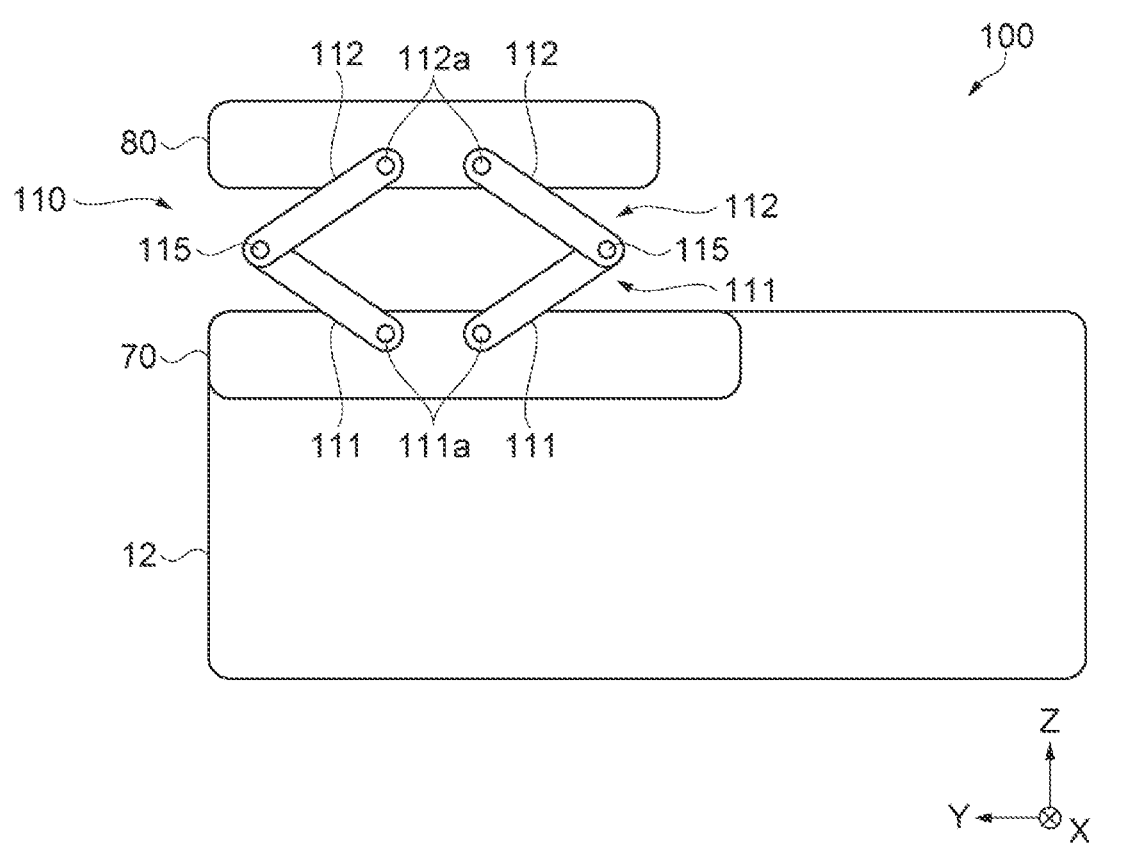
FIG. 7 is a schematic side view illustrating a recording device according to a second embodiment.

As illustrated in FIG. 7, the second cover 80 is moved by a movement mechanism 110 to the second open position for opening the space in which the imaging element 83 is provided, and to the second closed position for closing the space in which the imaging element 83 is provided. The movement mechanism 110 is provided on one side surface and the other side surface, in the X axis direction, of each of the first cover 70 and the second cover 80.

A configuration of the movement mechanism 110 provided on the one side surface will be described. The movement mechanism 110 includes a pair of lower link arms 111 and a pair of upper link arms 112. One end of each of the pair of lower link arms 111 is connected to the one side surface of the first cover 70 by a lower connecting pin 111a. One end of each of the pair of upper link arms 112 is connected to the one side surface of the second cover 80 by an upper connecting pin 112a. The other end of each of the pair of lower link arms 111 and the other end of each of the pair of upper link arms 112 are connected in a pantograph manner by a connecting pin 115.

When the second cover 80 in the second closed position is lifted in a state in which the first and second operating portions 84 and 85 are pressed by the user, each of the arms 111 and 112 of the movement mechanism 110 rises up, and the second cover 80 moves upward with respect to the first cover 70 and moves to the second open position. The movement direction of the second cover 80 includes the same upward movement component as the movement direction of the first cover 70. As a result, since the space in which the imaging element 83 is provided is exposed, the maintenance of the reading unit 60 becomes easy. Note that in this embodiment, the movement mechanism 110 is exemplified in which the second cover 80 moves upward with respect to the first cover 70. However, a movement mechanism in which the second cover 80 moves upward and then further moves rearward, or a movement mechanism in which the second cover 80 moves upward and then further moves leftward or rightward may also be employed.

What is claimed is:

1. A recording device comprising:
   a first cover configured to be movable with respect to a recording unit configured to perform recording on a recording medium, the first cover being configured to move to a first open position for opening a space where the recording medium, on which recording is to be performed by the recording unit, is transported, and to a first closed position for closing the space; and
   a second cover movable with respect to the first cover, the second cover being configured to pivot about a support shaft with respect to the first cover, and move to a second open position for opening a space where an imaging element is provided configured to read a medium to be read positioned between the first cover and the second cover, and to a second closed position for closing the space, wherein
   a movement direction of the first cover and a movement direction of the second cover, with respect to the recording unit, include a same directional component,
   a first coupling portion configured to couple the first cover and the second cover is provided, such that when the first cover and the second cover are coupled by the first coupling portion, the second cover is prevented from being movable with respect to the first cover, a holding mechanism configured to hold the second cover in the second open position is provided, and the medium to be read is configured to be transported while being sandwiched between a first roller provided at an upper surface of the first cover and a second roller provided at a lower surface of the second cover.

2. The recording device according to claim 1, comprising:

a second coupling portion configured to couple the first cover and the second cover, wherein the first coupling portion is provided on one outward side of a transport path on which the medium to be read is transported, the second coupling portion is provided on another outward side of the transport path, and a first operating portion configured to switch the first coupling portion between a coupled state and an uncoupled state, and a second operating portion configured to switch the second coupling portion between a coupled state and an uncoupled state are provided.

3. The recording device according to claim 2, comprising:

a gripping portion configured to be gripped when the first cover is opened, wherein the first operating portion and the second operating portion have a different color from a color of the gripping portion.

4. A recording device comprising:

a first cover configured to be movable with respect to a recording unit configured to perform recording on a recording medium, the first cover being configured to move to a first open position for opening a space where the recording medium, on which recording is to be performed by the recording unit, is transported, and to a first closed position for closing the space; and a second cover movable with respect to the first cover, the second cover being configured to pivot about a support shaft with respect to the first cover, and move to a second open position for opening a space where an imaging element is provided configured to read a medium to be read positioned between the first cover and the second cover, and to a second closed position for closing the space, wherein a movement direction of the first cover and a movement direction of the second cover, with respect to the recording unit, include a same directional component, a first coupling portion configured to couple the first cover and the second cover is provided, such that when the first cover and the second cover are coupled by the first coupling portion, the second cover is prevented from being movable with respect to the first cover, the first coupling portion being provided on one outward side of a transport path on which the medium to be read is transported, a second coupling portion configured to couple the first cover and the second cover is provided, the second coupling portion being provided on another outward side of the transport path, a holding mechanism configured to hold the second cover in the second open position is provided, and a first operating portion configured to switch the first coupling portion between a coupled state and an uncoupled state, and a second operating portion configured to switch the second coupling portion between a coupled state and an uncoupled state are provided.

5. The recording device according to claim 4, comprising:

a gripping portion configured to be gripped when the first cover is opened, wherein the first operating portion and the second operating portion have a different color from a color of the gripping portion, the second cover is configured to pivot about a support shaft with respect to the first cover, and move to a second open position for opening a space where an imaging element is provided configured to read a medium to be read positioned between the first cover and the second cover, and to a second closed position for closing the space, and a holding mechanism configured to hold the second cover in the second open position is provided.

6. The recording device according to claim 4, wherein the medium to be read is configured to be transported while being sandwiched between a first roller provided at an upper surface of the first cover and a second roller provided at a lower surface of the second cover.

* * * * *